United States Patent Office 3,332,004
Patented July 18, 1967

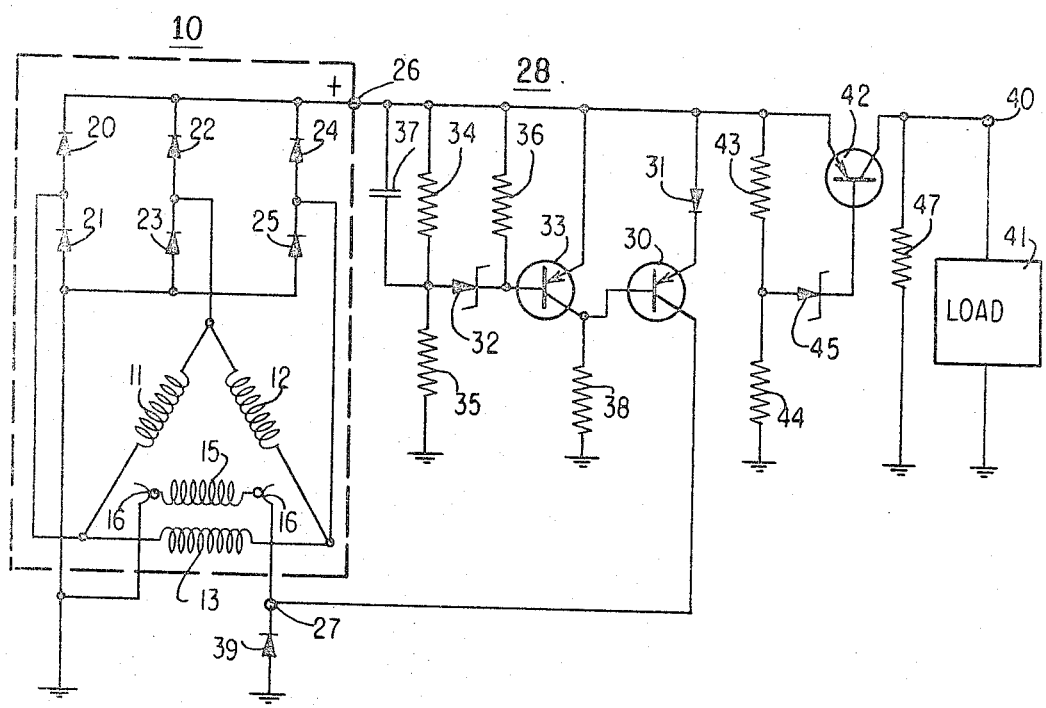

3,332,004
ELECTRICAL GENERATOR SYSTEM
Charles L. Shano, Morton Grove, Ill., assignor to Motorola, Inc., Franklin Park, Ill., a corporation of Illinois
Filed Oct. 31, 1963, Ser. No. 320,381
3 Claims. (Cl. 322—28)

This invention relates to alternator and regulator systems, and more particularly to an alternator driven by an engine to form a source of electrical energy and wherein there is no battery associated with the engine to provide current when the alternator is not operating.

Alternator and regulator systems are now used quite commonly to provide a source of electrical energy for automobiles and other motor vehicles. In such equipment the alternator cooperates with a battery which provides current when the alternator is not operating. The alternator acts to charge the battery, and the battery may provide initial field current to cause operation of the alternator. There is a requirement, however, for electricity in connection with engines which have no battery to provide current when the motor is not operating. For example, certain highway equipment uses diesel engines which have air starters to initiate operation of the engine. Although a battery is not required for operating such engine, it may be desirable to have lights and other electrically operated devices with the equipment.

It has been proposed to couple an alternator to the engine to provide current, but it is necessary to provide a rotating field to start the alternator in operation. This may be provided by a permanent magnet in the alternator field, or by constructing the field to retain magnetism. However, if substantial permanent magnetism is used, the alternator cannot be regulated and will provide excessively high voltage at high speed. It is therefore desired to provide the field current through a regulator so that the maximum voltage can be limited to prevent excessive voltage. In order to provide effective regulation, the residual magnetism must be low, and this makes it difficult to provide sufficient output from the alternator at low speed to excite the alternator field through the regulator. This is particularly true if a load is continuously connected to the alternator as this tends to keep the alternator voltage from rising.

It is therefore an object of the present invention to provide an improved alternator and regulator system for use with an engine and which operates without connection to a battery or other source of current.

A further object of the invention is to provide an alternator for use in a system having no battery, with a regulator which applies the full alternator output to the field when the alternator starts to provide maximum alternator field.

A feature of the invention is the provision of an alternator having a field with residual magnetism for providing initial output which is rectified and applied to the field to excite the same, with a load connected to the alternator through a circuit which disconnects the load until the alternator output voltage reaches a predetermined value, so that the full alternator output is initially used to provide field excitation for the alternator.

Another feature of the invention is a provision of an alternator for use with an engine in a system having no battery, with a transistor regulator circuit for applying the alternator output to the field to excite the same, and a transistor disconnect circuit including a Zener diode to disconnect the load from the alternator until the alternator voltage exceeds a predetermined value.

The invention is illustrated in the drawing wherein the single figure is a circuit diagram of the alternator regulator system of the invention.

In practicing the invention there is provided an alternator of the type used in automotive vehicles, having a three phase stator or armature to which are connected rectifiers for full wave rectification. The alternator includes a rotor providing a field and including a magnetic structure having some residual retentivity, and a winding thereon. Connected to the direct current output of the rectifiers is a transistorized regulator for controlling the flow of current to the field winding. Since the voltage of the system is not stabilized by a battery, the control transistor has a rectifier connected in series therewith to provide low leakage when the control transistor is turned off. A transistor switch is connected between the rectifiers and the load to cut off the load until the output of the alternator reaches a given value, which may be slightly below the operating voltage of the system. Therefore until the output of the voltage produced by the rectifiers reaches this value there will be no load so that the full output of the alternator is applied to excite the alternator field. The alternator voltage will therefore rise to increase the excitation voltage so that the alternator rapidly produces full output voltage. A Zener diode is used with the transistor switch, and when the output alternator voltage reaches the given value, the Zener or avalanche voltage of the diode is overcome to cause the transistor switch to conduct so that the load is energized by the direct current provided by the alternator and rectifiers.

Referring now to the drawing, there is shown schematically an alternator 10 of the type now used to form an electrical source in automobiles. Alternator 10 includes fixed armature windings 11, 12 and 13 and a rotor with field winding 15 thereon. The field winding is connected in the circuit by slip rings 16. Connected to the armature windings are rectifier pairs 20, 21; 22, 23 and 24, 25. These rectifiers provide full wave rectification of the three phases of alternating current provided by the armature windings 11, 12 and 13, so that direct current voltage is provided at terminal 26.

The rotor of the alternator must be designed to have some residual magnetism. This may be provided by the use of iron in the field structure which retains magnetism, or by placing a permanent magnet of slight strength in the field structure. The residual or permanent field is supplemented by the field produced by winding 15, to which current is applied from the field terminal 27.

A voltage regulator 28 controls the current applied from the rectifier terminal 26 to the field terminal 27 of the alternator. The regulator includes an output transistor 30 connected in series with rectifier 31 between the terminal 26 and the terminal 27. When the transistor 30 is rendered conducting, current flows through rectifier 31 and transistor 30 to the field winding 15. When the transistor 30 is rendered non-conducting this current supply is cut off. The diode 31 is provided to prevent current flow to the field winding 15 due to leakage through the transistor 30. The rectifier 31 may be of the type having low leakage such as a silicon rectifier.

Transistor 31 is controlled by a switching circuit including Zener diode 32 and transistor 33. Resistors 34 and 35 form a voltage divider, and the Zener diode 32 is connected in series with resistor 36 across resistor 34. When the voltage at terminal 26 reaches a value such that the voltage across resistor 34 rises to the breakdown voltage of diode 32, this diode will conduct so that current will flow through resistors 35 and 36. This will drop the voltage at the base of transistor 33 causing said transistor 33 to conduct. When transistor 33 conducts, voltage will be developed across resistor 38 to cause the voltage at the base of transistor 30 to rise. This will cut off transistor 30. Capacitor 37 is bridged across resistor 34 to provide a time constant to the change in voltage across the Zener diode 32 so that switching does not take place in response to transient voltages.

When the alternator starts to operate, the residual magnetism results in a low voltage being produced at terminal 26. Zener diode 32 will not conduct, and the base and emitter of transistor 33 will be at the same potential so that this transistor will not conduct. There will be no current flowing through resistor 38, so the base of transistor 30 will be at ground potential. This will cause transistor 30 to conduct so that the entire voltage appearing at terminal 26 will be applied through rectifier 31 and transistor 30 to terminal 27 to energize the field 15. This increase in the field will cause the alternator output voltage to increase, and the effect is cumulative as increase in output voltage will increase the field excitation. When the voltage at terminal 26 reaches a value such that Zener diode 32 conducts, this will render transistor 33 conducting and cut off transistor 30 to stop the flow of field current. The regulator will thereafter hold the voltage at output terminal 26 at the predetermined value. Rectifier 39 provides a path for reverse current from the field.

Because there is no battery connected to the alternator system to stabilize the voltage, the voltage at terminal 26 can possibly reach a much higher value than the predetermined desired output voltage of the system. This voltage can produce sufficient leakage current through transistor 30, even when it is cut off, so that the field of the alternator will be maintained to continue the high output voltage. For this reason, diode 31 is connected in series with transistor 30, and when the transistor 30 is cut off, this acts to cut off the diode 31. The diode can be selected to have leakage which is sufficiently small that the field produced by leakage current will not be effective. A silicon diode for example, would be suitable for this purpose.

The load 41 on the electrical system may be connected to output terminal 40. The terminal 40 is connected to the rectifier output terminal 26 by the emitter-collector circuit of transistor 42. Resistors 43 and 44 form a voltage divider to provide a potential to Zener diode 45 which is connected from the voltage divider to the base electrode of transistor 42. The values of resistors 43 and 44 are selected with reference to the breakdown voltage of Zener diode 45 and the desired operating voltage of the system so that when the voltage at terminal 26 reaches a given value, somewhat below the full operating voltage of the system, the diode 45 will conduct. This takes place when the voltage developed across resistor 43 is greater than the Zener diode breakdown voltage. When the diode 45 conducts, this renders transistor 42 conducting so that the emitter-collector path thereof connects terminal 26 to the terminal 40. Resistor 47 may be connected to the collector electrode of transistor 42 to provide a minimum fixed load.

When the alternator system starts to operate, the voltage at point 26 will be substantially less than the desired operating voltage and the voltage across resistor 43 of the voltage divider is not sufficient to overcome the breakdown voltage of Zener diode 45. Transistor 42 will therefore be cut off to disconnect the load from the rectifiers of the alternator Since there is no load on the alternator and the full output is applied to the field, the excitation will increase as previously stated so that the output voltage continues to rise. The desired output voltage will therefore be rapidly reached and when this value is approached, the voltage across resistor 43 will be sufficient to cause Zener diode 45 to conduct, so that transistor 42 conducts to connect the load to the alternator.

In the absence of the switch 42 the current provided by the alternator would be divided between the load 41 and the field, and the field excitation would not increase as fast. Actually the load might be sufficient to prevent rise in voltage at the alternator output so that the alternator would not reach its desired operating voltage. By disconnecting the load until the voltage rises to a value to provide adequate field excitation, full alternator output can be assured.

The invention therefore provides an alternator and regulator system which is of particular application for use with the engine of an equipment which does not have a battery or other source of electrical energy. By providing some residual magnetism in the alternator field, the alternator can be made to start. However, the magnetism is held to a minimum value and the main excitation is provided by current derived from the alternator output, so that the alternator output voltage can be controlled by a regulator. By providing a switch for disconnecting the load until the alternator voltage reaches a value approaching its desired operating value, the entire alternator output is applied to the field and the alternator quickly reaches its operating voltage. The load is then connected, and as the alternator is providing almost its full output voltage, the load is properly energized.

I claim:

1. An electrical supply system including in combination, an alternator unit having field means with residual magnetism and rectifier means providing a direct current output at a first terminal, regulator means connected to said first terminal and including a current controlling transistor, means including said transistor and a diode having low leakage current connected in series with said transistor between said first terminal and said field means for controlling the energization of said field means so that a predetermined voltage is produced at said first terminal, a load terminal, a transistor having a control electrode and output electrodes connecting said first terminal to said load terminal, and voltage sensing means including a Zener diode coupled between said first terminal and said control electrode for disconnecting said load terminal therefrom when the voltage at said first terminal is less than a given value which is below said predetermined value, whereby upon initial operation of said alternator unit the residual magnetism of said field means produces an output at said first terminal which is applied to said field means, and the entire output of said alternator is applied to said field means until the voltage at said first terminal reaches said given value.

2. An electrical supply system including in combination, an alternator unit having field means with residual magnetism and rectifier means providing a direct current output at a first terminal, regulator means connected to said first terminal and to said field means for controlling the energization of said field means so that a predetermined voltage is produced at said first terminal, a load terminal, a transistor having a control electrode and output electrodes connecting said first terminal to said load terminal, and voltage sensing means including a Zener diode coupled between said first terminal and said control electrode for disconnecting said load terminal therefrom when the voltage at said first terminal is less than a given value which is below said predetermined value, whereby upon initial operation of said alternator unit the residual magnetism of said field means produces an output at said first terminal which is applied to said field means, and the entire output of said alternator is applied to said field means until the voltage at said first terminal reaches said given value.

3. An electrical supply system including in combination, an alternator unit having field means with residual magnetism and rectifier means providing a direct current output at a first terminal, regulator means connected to said first terminal and to said field means for controlling the energization of said field means so that a predetermined voltage is produced at said first terminal, a load terminal, a transistor having a control electrode and output electrodes connecting said first terminal to said load terminal, and voltage sensing means including reference means coupled between said first terminal and said control electrode for applying a potential to said control electrode to render said transistor non-conductive in response to a voltage at said first terminal less than a given value which is below said predetermined value to thereby disconnect said load terminal from said first terminal, whereby upon initial operation of said alternator unit the residual magnetism of said field means produces an output at said first terminal which is applied to said field means, and the entire output of said alternator is applied to said field means until the voltage at said first terminal reaches said given value.

References Cited

UNITED STATES PATENTS

| | | | |
|---|---|---|---|
| 2,959,717 | 11/1960 | Conger | 317—31 X |
| 3,001,100 | 9/1961 | Schub et al. | 317—31 |
| 3,098,964 | 7/1963 | Hetzer | 322—28 |
| 3,101,441 | 8/1963 | Curry. | |
| 3,160,786 | 12/1964 | Faglie | 317—31 X |
| 3,185,916 | 5/1965 | Brewster | 322—28 |
| 3,193,755 | 7/1965 | Zelina | 322—28 |
| 3,243,658 | 3/1966 | Blackburn | 317—23 X |

FOREIGN PATENTS 773,817 11/1934 France.

OTHER REFERENCES

Silicon Zener Diode and Rectifier Handbook, TK 7872 S4 M66, 1961, Motorola, page 79 and page 90.

MILTON O. HIRSHFIELD, *Primary Examiner.*

J. J. SWARTZ, J. W. GIBBS, *Assistant Examiners.*